July 15, 1969          H. A. McMASTER          3,455,671

GAS SUPPORT BED APPARATUS FOR TREATING GLASS

Filed May 9, 1966          2 Sheets-Sheet 1

INVENTOR.
Harold A. McMaster
BY
Barnard, McGlynn & Reising
ATTORNEYS

July 15, 1969      H. A. McMASTER      3,455,671

GAS SUPPORT BED APPARATUS FOR TREATING GLASS

Filed May 9, 1966      2 Sheets-Sheet 2

INVENTOR.
Harold A. McMaster
BY
Barnard, McGlynn & Reising
ATTORNEYS

United States Patent Office 3,455,671
Patented July 15, 1969

3,455,671
GAS SUPPORT BED APPARATUS FOR
TREATING GLASS
Harold A. McMaster, Woodville, Ohio, assignor to Permaglass Inc., Woodville, Ohio, a corporation of Ohio
Filed May 9, 1966, Ser. No. 548,754
Int. Cl. C03b 17/00
U.S. Cl. 65—182    11 Claims

ABSTRACT OF THE DISCLOSURE

A method and apparatus for transferring heat between a sheet of material such as glass and fluid wherein there is included a plurality of exhaust passages and a plurality of inlet passages. Each of the exhaust passages is coaxial with and disposed within an inlet passage and each exhaust passage includes an outwardly flared means so that fluid flows through the inlet passages and along and about the exhaust passages and is directed toward the sheet at an angle of less than 90 degrees by the flared means thereby creating static fluid pressure between adjacent inlet passages to force the fluid through a turn of more than 180 degrees in flowing to the exhaust passages.

---

This invention relates to a method and apparatus for transferring heat between a sheet of glass and a fluid and, more specifically, to a flow control means for directing fluid from a plurality of inlet passages toward the sheet so as to increase the fluid pressure between adjacent inlet passages to support the sheet and to force the fluid to impinge the sheet and flow to one of a plurality of exhaust passages.

In the tempering of a sheet of glass it is desirable to uniformly temper the glass over the entire surface. To accomplish a uniform temper in a sheet of glass, it is necessary to establish a uniform heat transfer rate from the glass to the fluid over the entire area of the glass during the period of tempering. Among other factors, the tempering of glass depends upon the mass flow rate of cool fluid contacting the glass. In other words, the greater the volume of fluid which contacts the glass, the greater the amount of heat which is transferred to the fluid, and the faster the fluid contacts and leaves the glass, the faster the heat will be conveyed from the glass. In addition, a maximum amount of heat is transferred from the glass to the fluid when the fluid is impinged against the glass. That is to say, when the fluid is not impinged against the glass, as when the fluid travels parallel to the glass, an insulating boundry layer of fluid is formed on the glass surface and greatly reduces the heat transfer from the glass to the fluid.

Sheets of glass have heretofore been tempred by floating the sheet of glass over a bed having inlets for impringing the glass with fluid and for supplying fluid upon which the glass is supported, and having exhausts for conducting the fluid away from the glass. In the utilization of such a bed there must be areas of pressure to support or float the sheet of glass above the bed, and at the same time there must be areas about the inlets where the fluid is impinged upon the sheet of glass to transfer heat from the glass. There also must be a sufficient number of exhausts with a sufficient aggregate area to provide a low pressure area for the fluid to flow to after it has impinged the glass. As alluded to previously, it is desirable to provide a maximum volume of fluid flow at a maximum velocity through the inlets to convey the maximum amount of heat from the glass in as short a time as possible; however, the greater the mass flow rate of fluid through the inlets, the greater the aggregate area of the inlets must be, and as the aggregate area of the inlets is increased, the area available for the exhausts and the area available for pressure areas, to support the sheet of glass both decrease. The pressure areas, however, must be sufficient in area to support the sheet at a sufficient distance from the bed to provide space enough between the sheet and the bed to allow a sufficient volume of fluid for conveying the required amount of heat to flow between the sheet and the bed from the inlets to the exhausts. In contrast, the area of fluid pressure is normally static and/or low flow and thus minimizes the transfer of heat from the sheet to the flow.

Accordingly, it is an object and feature of this invention to provide a flow control means for transferring heat between a sheet of glass and a fluid wherein the aggregate area of the pressure areas supporting the sheet is minimized yet the sheet floats at a sufficient distance above the bed to allow a large volume of fluid to flow from inlets for impinging the sheet over a large aggregate area and to exhausts having a maximum aggregate area for providing a low pressure area to which the fluid readily flows.

Another object and feature of the instant invention is to provide a fluid flow control means for floating a sheet of glass and to transfer heat from the sheet by ejecting fluid from a plurality of inlets toward the sheet of glass at an angle less than 90° to increase the fluid pressure between the inlets to support the sheet and to cause the fluid to flow through a turn of more than 90° to impinge the sheet and then to flow into an adjacent exhaust.

In general, these and other objects and features of the instant invention may be attained by an apparatus including first and second oppositely disposed flow directing units for transferring heat between a sheet of glass which is disposed between the units. At least one of the flow directing units includes a first wall adjacent the space between the units and which wall includes a plurality of inlet passages for supplying fluid from a plenum chamber within the unit to the space between the units. Duct means supplies fluid to the plenum chamber within the unit. A plurality of exhaust passages are provided to exhaust the fluid from the space between the units and each exhaust passage is coaxial with and disposed within one of the inlet passages. The wall of the unit has an outer surface adjacent the space between the units and each exhaust passage includes outwardly flared means. Fluid flows through the inlet passages along and about the exhaust passages and is directed toward the sheet at an angle of less than 90° by the flared means thereby to increase the fluid pressure between adjacent inlet passages for supporting the sheet and to force the fluid to flow through a turn of more than 90° and then to flow to the exhaust passages. The sheet of glass is floated at a sufficient distance from the wall of the unit so that a large mass flow rate of fluid flows between the unit and the sheet thereby to convey a large amount of heat from the sheet in a minimum period. In addition, the aggregate area of the fluid under pressure for supporting the glass sheet between the inlets is minimized and the area of the sheet being impinged by fluid ejected from the inlets is maximized and the aggregate area of the exhausts is maximized and height of float is maximized.

Other objects and attendant advantages of the present invention will be readily appreciated as the same becomes better understood by reference to the following detailed description when considered in connection with the accompanying drawings wherein.

Figure 1:
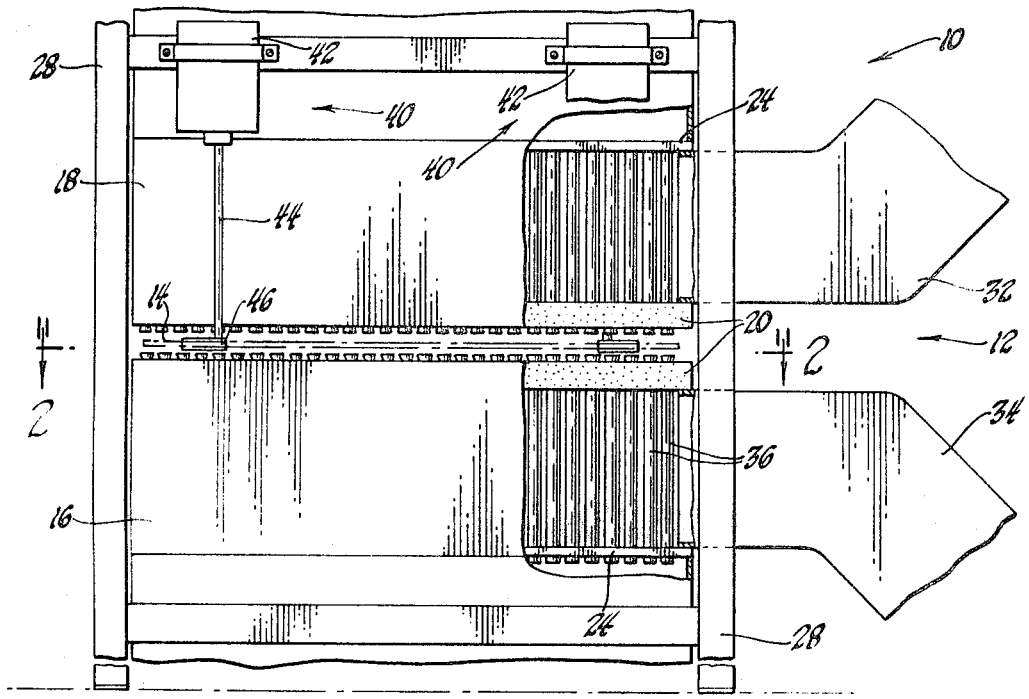
FIGURE 1 illustrates the preferred embodiment of the apparatus of the instant invention.

Referring now to the drawings, wherein like numerals indicate like or corresponding parts throughout the several views, an apparatus for transferring heat between a sheet of glass and a fluid is generally shown at 10. The illustrated heat treating apparatus 10 is frequently referred to as a blast-head and includes a flow control means, generally shown at 12, for directing fluid to impinge the sheet of glass 14 and thereafter to turn through an angle of more than 90° and to flow away from the sheet. The flow control means 12 includes the first and second oppositely disposed flow directing units 16 and 18. The sheet of glass 14 is disposed between the units 16 and 18 so that fluid is ejected from the units and heat is transferred from the sheet of glass 14 to the fluid.

Preferably, both flow directing units 16 and 18 will be identical; however, it should be understood that a unit constructed in accordance with the instant invention may be disposed in spaced relationship to one of various other units as, for example, the unit set forth in application S.N. 548,737 filed May 9, 1966, in the name of Ronald A. McMaster and assigned to the assignee of the instant invention, or the unit set forth in application S.N. 548,532 filed May 9, 1966, in the names of Harold A. McMaster and Ronald A. McMaster and assigned to the assignee of the instant invention. The units 16 and 18 as illustrated, however, are identical and each includes a first wall 20 which is adjacent the space between the units and has an outer surface 22. The walls 20 are preferably made of a heat-resistant material such as ceramic, sintered fused quartz, metal, or the like. Each of the units 16 and 18 includes a second wall 24 spaced from the first wall 20 to form a plenum chamber 26 in each of the units. The units 16 and 18 are secured to the frame 28 by welding, bolting, or in any other appropriate manner. A plurality of inlet passages 30 extend through the walls 20 to provide fluid communication from the plenum chambers of each unit to the space between the units. The duct means including the ducts 32 and 34 supplies fluid to the respective plenum chambers 26, which fluid in turn flows through the inlet passages 30 to the space between the units for impingement against the sheet 14.

Figure 5:
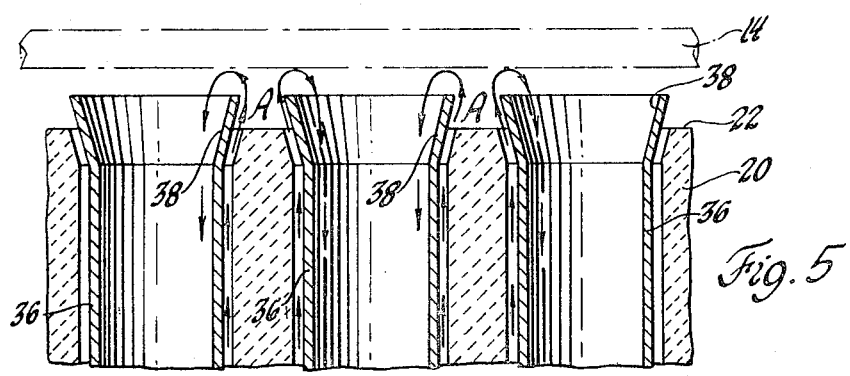
FIGURE 5 is an enlarged fragmentary view similar to FIGURE 3 and showing a floating sheet of glass.

There is also included a plurality of exhaust passages 36 formed by tube-like members for exhausting fluid from the space between the units. The exhaust passages 36 each extend from the space between the units through the wall 20, through the plenum chamber 26, and through the second wall 24 whereby fluid flows from the space between the units to atmosphere. Each exhaust passage 36 includes an outwardly flared means 38 for directing the fluid from each inlet passage 30 toward the sheet 14 at an angle of less than 90° to increase the pressure between adjacent inlet passages which in turn causes the fluid to flow through a turn of more than 90° and then to flow to an adjacent exhaust passage 36; hence, the fluid has flowed through an angle of more than 180° when it is moving downward in an exhaust passage 36. Although the fluid may not flow parallel to the sheet for any substantial distance, the flow path may be described by stating that the fluid is directed toward the sheet at an angle of less than 90° and is forced by the buildup of static pressure between the inlets to flow through a turn of more than 90° for flowing parallel to the sheet and thereafter flows into an adjacent exhaust passage, thus making a total turn of more than 180°. More specifically, each exhaust passage 36 is coaxial with and disposed within an inlet passage 30 and the outwardly flared means 38 extends from the surface 22 of one of the walls 20. As illustrated in FIGURE 5, fluid flows through the inlet passages 30 along and about the exhaust passages 36 and is directed toward the sheet by the flared means 38 at an angle of less than 90° The static pressure of the fluid in the area A between the respective inlet passages is increased sufficiently to support the sheet of glass 14. That is to say, the fluid being ejected from the inlet passages 30 has a horizontal component of velocity which is converted into static pressure in the area A to support the sheet of glass 14. Due to the conversion of this horizontal component of velocity to static pressure, therefore, a small area of high static pressure is created to support the sheet at a relatively high distance above the surface 22 of the lower unit 16. Thus, the aggregate area of static pressure for supporting the sheet is minimized to allow a greater area for impingement of fluid on the sheet and greater area for the exhausts. In addition, the buildup of static pressure in the area A forces the fluid being ejected from the inlet passages 13 to flow through a turn of more than 90° as it approaches the glass and through an angle of more than 180° once it is flowing through an exhaust passage 36, thus increasing the area of impingement of fluid on the sheet 14 as the fluid flows into an adjacent exhaust passage 36. Thus, by utilizing the outwardly flared means 38 to direct the fluid from the inlet passages 30 toward the sheet of glass 14 at an angle of less than 90°, the horizontal component of velocity of the fluid being ejected from the inlet passages 30 is converted into sufficient static pressure to support the sheet of glass 14 over relatively small areas A and maximizes the area of fluid impingement on the sheet by forcing the fluid to flow through a turn of more than 90° as it approaches the glass and through a total turn of more than 180° in flowing into the exhaust passages 36. Such an arrangement allows a maximum aggregate area of exhausts and floats the sheet higher above the bed for a given plenum chamber pressure and fluid flow as compared to other float systems.

There is also included means, generally indicated at 40, for providing repetitive or oscillatory movement of the sheet 14 relative to the units 16 and 18 for effecting a substantially uniform transfer of heat over the entire sheet. The means 40 includes motors 42 each of which has a shaft 44 depending therefrom. Each shaft has a finger 46 disposed on the lower end thereof. Normally four motors are utilized, two on each side of the apparatus (only the motors on one side are shown). The fingers 46 are rotated into the space between the wall 20 of the units by the motors 42. The fingers 46 have a microswitch (not shown) thereon so that, when the glass sheets 14 contact the microswitch, the motors 42 are operated to rotate the shafts 44 and move the fingers 46 into the space between the units for pushing the glass sheet 14 toward the opposite side of the apparatus. When the glass sheet 14 reaches the opposite side of the apparatus, it contacts the fingers 46 on the opposite side of the apparatus and is pushed in the opposite direction in the space between the units 16 and 18. Hence, the glass sheet 14 is provided with an oscillatory or repetitive motion. It is to be understood that many other devices may be utilized to provide relative movement between the glass sheet 14 and the apparatus. For example, the apparatus disclosed and claimed in copending application S.N. 548,752 filed May 9, 1966, in the name of Harold A. McMaster and assigned to the assignee of the instant invention may be utilized for moving the glass sheet relative to the apparatus in the instant invention.

Figure 2:
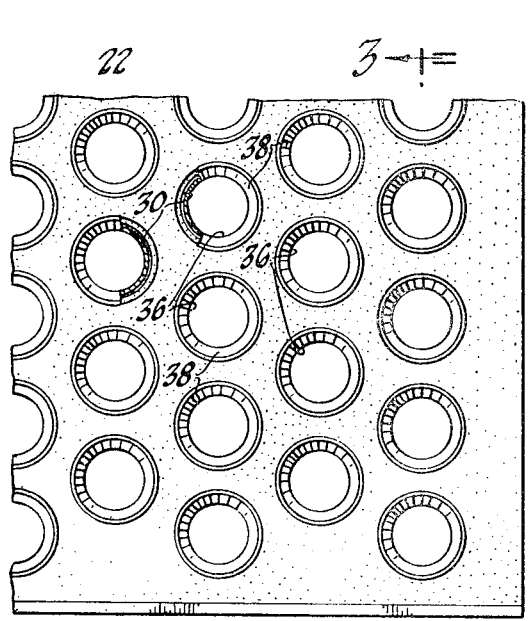
FIGURE 2 is an enlarged fragmentary cross-sectional view taken substantially along line 2—2 of FIGURE 1.
Figure 3:
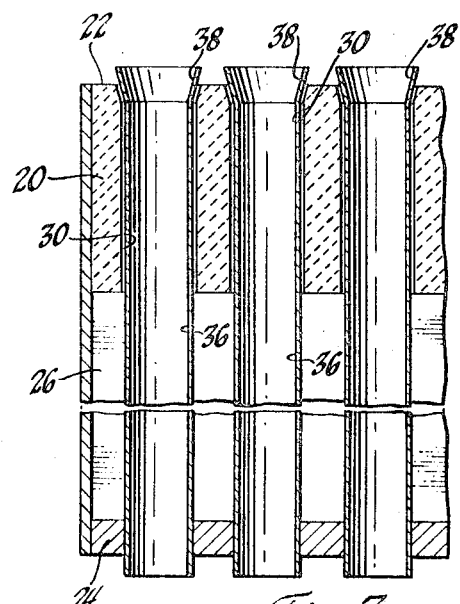
FIGURE 3 is a fragmentary cross-sectional view taken substantially along line 3—3 of FIGURE 2.
Figure 4:
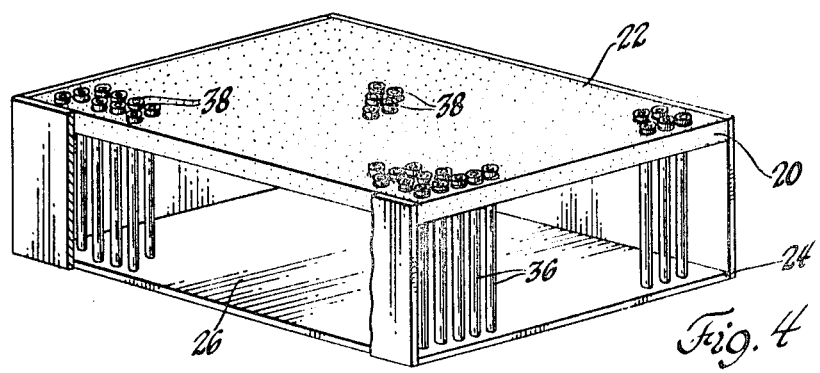
FIGURE 4 is a perspective view partly cut away of a flow directing unit utilized in the apparatus illustrated in FIGURE 1.

As will be noted in FIGURE 2, each inlet passage 30 and each exhaust passage 36 is positioned in an offset and overlapping relationship with respect to the adjacent inlet and exhaust passages both in a direction longitudinally of the units and in a direction transverse the longitudinal axis of the units. This overlapping relationship is important when the glass sheet 14 is moved relative to the units 16 and 18 to prevent striping of the sheet of glass as would occur if the inlet passages were aligned with the direction of oscillatory movement.

Figure 6:
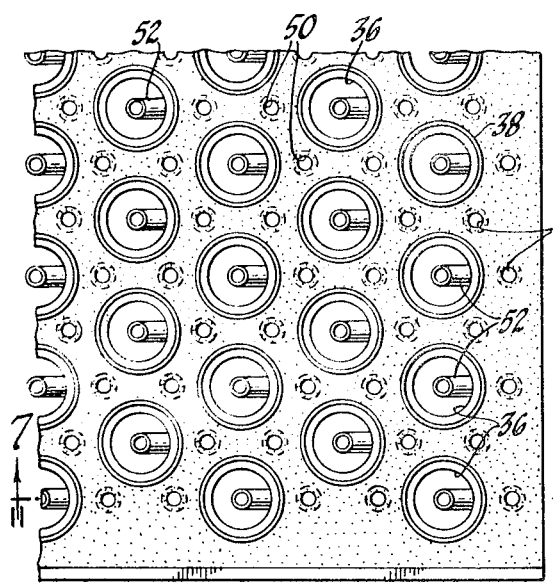
FIGURE 6 is an enlarged fragmentary view of an alternative embodiment of a flow directing unit constructed in accordance with the instant invention.
Figure 7:
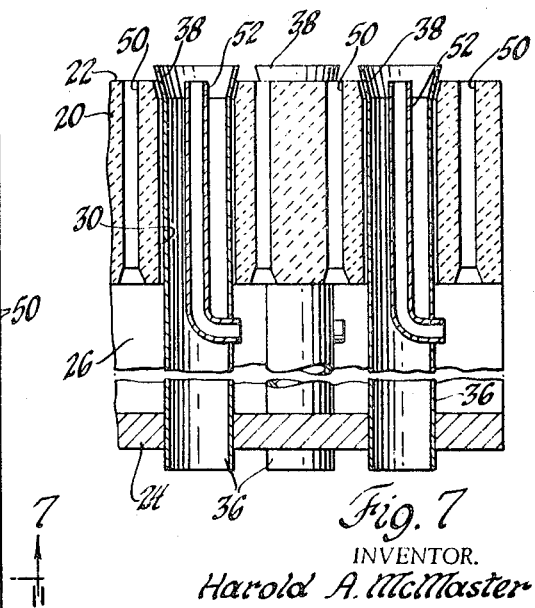
FIGURE 7 is a fragmentary cross-sectional view taken substantially along line 7—7 of FIGURE 6.

Referring now to FIGURES 6 and 7, there is illustrated another preferred embodiment of a flow directing unit constructed in accordance with the instant invention. The unit illustrated in FIGURES 6 and 7 is identical to the units 16 and 18 except for the addition of a second plurality of inlet passages 50 and the addition of a third plurality of inlet passages 52. Each of the inlet passages 30 is surrounded by six of the inlet passages 50 and each of the inlet passages 50 is surrounded by three of the inlet passages 30. The inlet passages 52 are each centrally disposed within one of the exhaust passages 36 and communicates with the plenum chamber 26 so that fluid flows from the plenum chamber 26 through the inlet passages 52 to impinge the sheet in an area centrally of the exhaust passages 36.

It is to be understood that the units 16 and 18 as illustrated in FIGURES 1 through 5 may be modified by including either or both of the inlet passages 50 and 52. It has been found that the utilization of the exhaust passages 36 including the outwardly flared means 38 in combination with the pattern of the inlet passages 50 illustrated in FIGURE 6 and/or in combination with the inlet passages 52 provides an improved apparatus for transferring heat between the fluid and the sheet of glass. The inlet passage and exhaust passage pattern per se which is illustrated in FIGURE 6 is more fully set forth in copending application S.N. 548,737 filed May 9, 1966, in the name of Ronald A. McMaster and assigned to the assignee of the instant invention.

As illustrated in FIGURES 1 and 5, the glass sheet 14 is supported on fluid above the lower unit 16, the units 16 and 18 being disposed substantially horizontally. It will be understood, of course, that the units 16 and 18 may be disposed vertically with a sheet of glass 14 supported by tongs, or other implements, between the walls 20 of the respective units for heat treating. Although the flared tubes 36 have been illustrated and described as extending above the surface 22, such flared portions need not extend above the surface 22 to accomplish the objects of the instant invention.

It will also be understood that although the instant invention has been illustrated and described in conjunction with quenching or tempering a sheet of glass, the invention may also be utilized in various other apparatuses for treating a sheet of glass. For example, the flotation system of the instant invention may be utilized in an elongated bed with conveying means adjacent the bed for guiding a sheet of glass over the bed while floating the sheet on fluid to transfer heat between the glass and the fluid. The sheet of glass may thus be heated for tempering or annealing. In addition, the elongated bed may have a curved portion so that the sheet of glass may be heated and curved as it is guided thereover. When the instant flotation system is utilized in such an elongated bed, there need not be a flow directing unit disposed above the bed for directing fluid against the upper surface of the sheet because other heating means may be disposed above the elongated bed. It is to be understood, therefore, that the flotation system of the instant invention may be utilized in various other environments than those specifically described and that such environments are intended to be within the scope of the instant invention.

The invention has been described in an illustrative manner and it is to be understood that the terminology which has been used is intended to be in the nature of words of description rather than of limitation.

The embodiments of the invention in which an exclusive property or privilege is claimed are defined as follows:

1. An apparatus for transferring heat between a sheet of material and fluid comprising flow control means including a plurality of exhaust passages and a plurality of inlet passages for converging fluid flow from adjacent inlet passages to convert a component of velocity thereof into static pressure between said inlet passages and to cause the fluid ejected from each inlet passage to change direction and impinge the sheet as the fluid flows to an exhaust passage, said flow control means including at least one surface with said inlet passages and said exhaust passages disposed therein, each of said exhaust passages being coaxial with and disposed within an inlet passage, each of said inlet passages terminating at said surface, each of said exhaust passages including an outwardly flared means extending from said surface and the associated inlet passage so that fluid flows through said inlet passages and along and about said exhaust passages and is directed toward the sheet at an angle of less than 90 degrees by said flared means thereby creating the static fluid pressure between adjacent inlet passages to force the fluid through a turn of more than 90 degrees in order to flow parallel to the sheet and whereby the fluid thereafter flows to said exhaust passages.

2. An apparatus as set forth in claim 1 including a second plurality of inlet passages each of which is centrally disposed within one of said exhaust passages.

3. An apparatus as set forth in claim 1 including means for providing repetitive relative movement between said surface and said sheet for effecting a substantially uniform transfer of heat over the sheet.

4. An apparatus as set forth in claim 1 including a second plurality of inlet passages spaced among said first mentioned inlet passages.

5. An apparatus as set forth in claim 4 wherein each of said first mentioned inlet passages is surrounded by six of said second plurality of inlet passages and each of said second plurality of inlet passages is surrounded by three of said first mentioned inlet passages.

6. An apparatus as set forth in claim 5 including a third plurality of inlet passages each of which is centrally disposed within one of said exhaust passages.

7. An apparatus as set forth in claim 1 wherein said surface is disposed substantially horizontally and the sheet is supported on said static pressure between said inlet passages.

8. An apparatus as set forth in claim 1 wherein said flow control means includes at least one flow directing unit having spaced first and second walls with said surface formed by the outer surface of said first wall, and duct means for supplying fluid into a plenum chamber formed between the walls of said unit, said inlet passages extending through said first wall to provide fluid communication from said plenum chamber to the exterior of said unit, each of said exhaust passages extending through said second wall, through said plenum chamber, through one of said inlet passages, and terminating in said flared means.

9. An apparatus for transferring heat between a sheet of glass and a fluid which includes a flow directing unit comprising; a first wall having a plurality of inlet passages therethrough for supplying fluid from the plenum chamber formed by said unit to the space over the surface of said wall, duct means for supplying fluid to said plenum chamber, and a plurality of exhaust passages for exhausting fluid from said space over said surface and including means directing fluid from each inlet passage toward the sheet for converting the component of velocity of the flow from each inlet passage, which component is parallel to the sheet, to static pressure between said inlet passages to cause said fluid to flow through a total turn of more than 180 degrees in flowing into an adjacent exhaust passage, thereby to increase the impingement of fluid on the sheet, each of said exhaust passages being coaxial with and disposed within an inlet passage, each of said inlet passages terminating at said surface of said wall, each of said exhaust passages including outwardly flared means extending outwardly from said surface of said wall whereby fluid flows through said inlet passages and along and about said exhaust passages and is directed toward the sheet at said angle of less than 90 degrees by said flared means thereby creating the static fluid pressure between adjacent inlet passages to force the fluid to flow through said total turn of more than 180 degrees.

10. An apparatus for floating a sheet of material on fluid which comprises flow control means having a plurality of inlet passages therein and a plurality of exhaust passages therein, each of said exhaust passages formed by a tube-like member disposed coaxially within one of said inlet passages, each of said tube-like members having a flared end extending beyond the extremity of the inlet passage in which it is disposed so that fluid flows through said inlet passages about said tube-like members and is deflected by the flared ends thereof.

11. In an apparatus for transferring heat between a sheet of material disposed on fluid over a surface having inlet and exhaustive passages therein and means for conveying fluid to said inlet passages and from said exhaust passages and with said inlet passages being spaced from one another and terminating at said surface, the improvement comprising: an independent flow directing means extending from said surface within each inlet passage for redirecting the fluid flow from each inlet passage toward the sheet at an angle of less than 90 degrees relative to said surface so that the flow ejected from each inlet passage has a component of directional movement toward adjacent inlet passages.

References Cited

UNITED STATES PATENTS

| | | | |
|---|---|---|---|
| 2,080,083 | 5/1937 | Magnien | 65—348 |
| 2,298,709 | 10/1942 | Long | 65—348 |
| 3,332,761 | 7/1967 | Fredley et al. | |
| 3,199,224 | 8/1965 | Brown | |
| 3,393,062 | 7/1968 | Hesten et al. | 65—104 X |

S. LEON BASHORE, Primary Examiner

A. D. KELLOGG, Assistant Examiner

U.S. Cl. X.R.

65—25, 104, 107, 114, 348; 214—1